United States Patent

James et al.

[11] 3,753,507
[45] Aug. 21, 1973

[54] WAREHOUSING AND INVENTORY CONTROL OF AUTOMOBILE AND TRUCK TIRES

[75] Inventors: Millard P. James; Keith B. Anderson, both of Portland, Oreg.

[73] Assignee: Millard P. James, Portland, Oreg.

[22] Filed: Mar. 18, 1971

[21] Appl. No.: 125,539

[52] U.S. Cl. ............... 214/16.4 R, 221/7, 221/301, 169/2 R
[51] Int. Cl. ............................................. B65g 1/06
[58] Field of Search .................... 214/16.4 R; 221/7, 221/301; 169/2

[56] References Cited
UNITED STATES PATENTS

| | | | |
|---|---|---|---|
| 1,981,783 | 11/1934 | DeBussey | 186/1 B |
| 2,304,455 | 12/1942 | Guerard | 221/7 |
| 3,508,669 | 4/1970 | Cook | 214/16 B |
| 493,087 | 3/1893 | Hayden | 221/301 |
| 2,124,500 | 7/1938 | Taylor | 221/7 |
| 2,568,272 | 1/1926 | Diago | 221/7 |
| 1,802,546 | 4/1931 | Albertoli | 214/16 B |
| 2,969,883 | 1/1961 | Cargill et al. | 214/16 B |

FOREIGN PATENTS OR APPLICATIONS
1,145,798  5/1957  France ............................ 169/2 R

*Primary Examiner*—Gerald M. Forlenza
*Assistant Examiner*—R. B. Johnson
*Attorney*—Kolisch & Hartwell

[57] ABSTRACT

A method and apparatus for the warehousing and dispensing of round objects such as tires with an inventory control thereof. A storage structure is subdivided into a number of individual chutes, with each chute having an infeed opening and an outfeed opening connected by a sloped runway. Tires of a particular size are placed in each chute and roll to the bottom thereof where they can be selectively released by an operator-controlled brake and ejector arm assembly provided near the outfeed opening. A conveyor is provided near the base of the structure for receiving tires released from the chutes and transporting them to a service area. Switch means are provided at the infeed and outfeed openings of each chute for monitoring the passage of tires. A running inventory count is visually displayed upon a remote console that is electrically responsive to the switch means.

2 Claims, 5 Drawing Figures

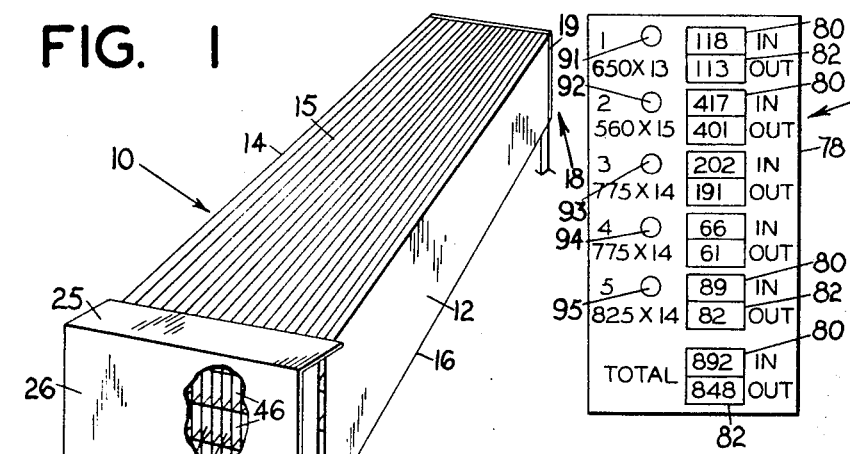
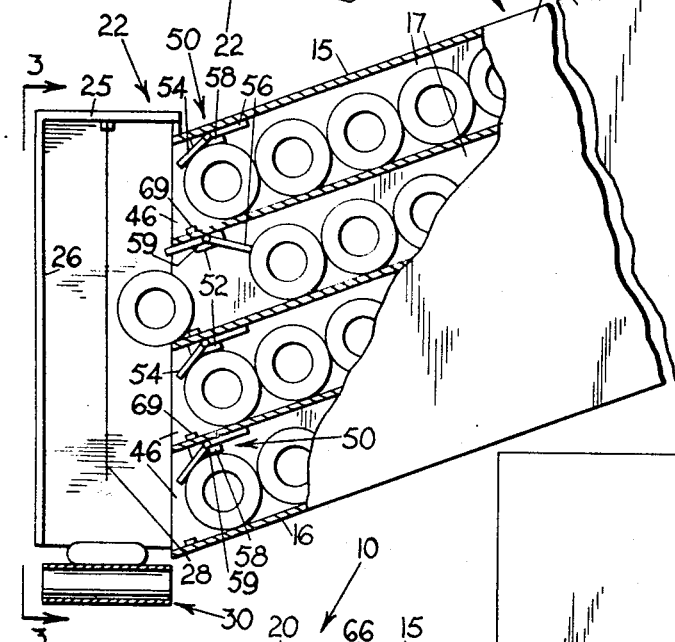
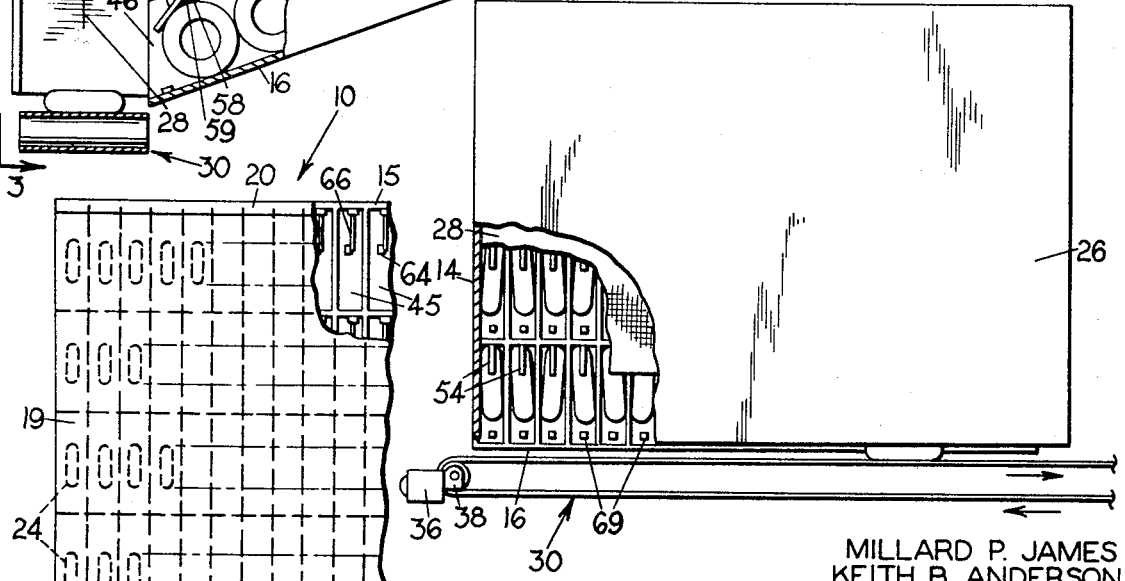
MILLARD P. JAMES
KEITH B. ANDERSON
INVENTORS.
BY Kolisch + Hartwell
ATTY.

WAREHOUSING AND INVENTORY CONTROL OF AUTOMOBILE AND TRUCK TIRES

BACKGROUND OF THE INVENTION

The invention concerns a method and apparatus for the warehousing and dispensing of round objects such as tires. More particularly, the invention concerns a structure, especially adapted for the warehousing of tires for vehicles such as automobiles and trucks, that enables an operator to have easy access to tires of all sizes with an inventory control thereof.

In warehouses where large numbers of automobile and truck tires are stored, it is usual to store such tires by stacking them in large piles, one on top of another. Tires stored in this manner are extremely difficult to handle and occupy a large amount of floor space, particularly when access to tires of all sizes is maintained. Furthermore, with tires stored in this manner there is no way to develop or maintain an accurate inventory count of the tires of each size that are on hand.

Accordingly, it is an object of the invention to provide an improved method and apparatus for storing and dispensing round objects such as automobile and truck tires, which overcome the disadvantages of storage methods and apparatus used in the prior art.

It is another object of the invention to provide an improved structure for warehousing and dispensing automobile and truck tires while maintaining an accurate running inventory of tires dispensed and on hand.

It is yet another object of the invention to provide a structure especially adapted for the storage of automobile and truck tires in a compact space with immediate and automatic access being provided to tires of any size.

It is a further object of the invention to provide a structure for warehousing of automobile and truck tires where the tires are stored in a suitable position to move by gravity onto a conveyor for delivery to a service area.

These and other objects of the invention are attained with a storage structure that is subdivided into a great number of individual chutes, with each chute being adapted to handle tires of a particular size. Each chute includes an infeed opening at the rear of the structure and an outfeed opening at the front of the structure. The infeed and outfeed openings are connected by a sloped runway forming the bottom of the chute. Tires of a particular size are inserted through the infeed opening of a given chute and permitted to roll to the bottom of the chute. As each tire is inserted into a given chute, it actuates a microswitch provided near the infeed end of that chute to detect the tires placed therein. A similar microswitch is provided near the outfeed end of the chute to detect the tires leaving that chute. A solenoid-controlled ejector arm is provided in the outfeed end of each chute to retain tires in the chute until they are needed. A brake arm responsive to the same solenoid is also provided in each chute for engaging and holding the second tire in the chute during the interval that the ejector arm is moved aside to release the tire at the bottom of the chute. Tires released from any of the chutes strike a deflector and fall onto a conveyor adapted to carry them to a desired loading or service area.

An inventory count of the tires in each chute is maintained upon a visual display console which also serves as a mount for buttons controlling the ejector solenoids. For example, the display console shows the number of tires placed in each chute and the number of tires released from each chute, as well as the total number of tires placed in the storage structure and the total number of tires released from the storage structure.

BRIEF DESCRIPTION OF THE DRAWINGS

Other objects and advantages of the invention will become apparent from the following detailed description of the invention taken in conjunction with the accompanying drawings, wherein:

FIG. 1 is a perspective view of one embodiment of the invention;

FIG. 2 is a side elevation view, in partial section, of the structure illustrated in FIG. 1;

FIG. 3 is a front elevation view in partial section taken along lines 3—3 in FIG. 1;

FIG. 4 is a fragmentary rear elevation view of the structure taken along lines 4—4 in FIG. 1; and FIG. 5 is a fragmentary view of the front of a display console suitable for use in conjunction with the structure illustrated in FIG. 1.

DETAILED DESCRIPTION OF THE INVENTION

Referring now to the drawings, one preferred embodiment of the invention is illustrated in the form of a storage structure 10 especially adapted for the warehousing and dispensing of automobile and truck tires. Storage structure 10 is of generally rectangular cross section including opposed sides 12, 14, a top 15 and a bottom 16. The storage structure is subdivided into a plurality of separate, individual elongate storage chutes 17 each having a rectangular cross section and extending between the rear end 18 and the front end 22 of the structure. The chutes are positioned in vertical and horizontal rows adjacent each other. The members forming the sides, top and bottom of structure 10 can be fabricated of a wide range of materials such as sheet metal fastened together by means of suitable structural supports, not illustrated. The individual storage chutes can also be fabricated of sheet metal, or other suitable material. As illustrated, the cross-sectional dimensions of chutes 17 are such that round objects, such as automobile and truck tires, can be supported therein in a substantially upright position. Sufficient clearance is provided on either side of the tires and the ceiling of the chutes to permit the tires to roll by the force of gravity.

Rear end 18 of the structure is closed by a door 19, slidably mounted, such as upon rails 20. A plurality of fire extinguishing units 24, such as conventional thermostatically-controlled $CO_2$ cartridges, are secured on the inner side of door 19, with each unit having a nozzle directed down a different chute 17 when door 19 is in a closed position.

Front end 22 of structure 10 is partially closed by an overhanging wall 25 extending across the front of the structure and having a vertically disposed wall 26 secured at the outer edge thereof. A flexible deflector 28, such as a canvas sheet, hangs from the underside of the overhanging wall midway of its width and extends substantially to the bottom of the structure. If desired, the front and rear of the structure could be completely closed in with locked doors to provide security for the items stored in the structure.

An endless conveyor 30 is provided adjacent front end 22 of structure 10, being supported by suitable means, not illustrated, and adapted to be selectively driven in the direction indicated by the arrow by a motor 36 and drive assembly 38. Conveyor 30 extends entirely across the front end of the storage structure and cooperates with another endless conveyor, not illustrated, to transport tires discharged from the storage structure to a remote service area.

Referring particularly to FIGS. 2 and 3, each chute 17 communicates with rear end 18 of the structure by an inlet opening 45 and with the front end 22 by a discharge opening 46. As illustrated, the rear of the structure is supported on legs so that the inlet opening of the chute is elevated with respect to the discharge opening, and each chute has a downwardly sloping runway or bottom connecting the inlet and discharge openings so that tires placed in the chute will roll toward the discharge end.

A brake and ejector assembly 50 is provided in each chute, with each assembly including a solenoid-controlled air valve 52, an ejector arm 54 and a brake arm 56. A housing 58 of valve 52 is secured to the ceiling of the chute and a shaft 59 is provided, extending through the side of housing 58. Shaft 59 is adapted to rotate through a partial revolution in a clockwise direction as viewed in FIG. 2 when valve 52 is actuated. Shaft 59 is spring loaded so that it returns to its rest position when valve 52 is unactuated. Valve 52 is furnished with air from a source, not shown, and is electrically connected with a control button on a remote console, such as that illustrated in FIG. 5, for operator control thereof.

Brake arm 56 comprises an elongate bar having one end secured to shaft 59 for movement therewith and having its free end normally positioned at rest near the ceiling of the chute in the position shown in solid outline in the uppermost chute in FIG. 2. Ejector arm 54 also comprises an elongate bar having one end connected to shaft 59 for movement therewith and having its free end normally positioned in the path of the tire positioned at the lower end of the chute. Upon actuation of valve 52, the ejector arm and the brake arm are rotated, respectively, in a clock-wise direction to the position shown in the second chute in FIG. 2.

Alternatively the brake and ejector assembly can be positioned on the floor of the chute with the ejector arm and brake arm serving to cradle the tire. The arms are operated in a manner similar to that previously described to selectively release the first tire in the chute and brake the second tire. The advantage of the alternative structure is that, with the assembly positioned on the floor of the chute, tires of all sizes, are reliably handled by a chute of a single height.

A pressure responsive microswitch 61, of conventional design, is positioned on the bottom of each chute near the inlet opening, to detect the passage of each tire placed in a chute. A roller 64 is provided in each chute and is journaled for rotation at the free end of a flat leaf spring 66; the other end of which is secured to the ceiling of the chute. The spring suspends roller 64 in the path of tires placed in the chute and together they act as biasing means which urges a tire against the switch, whereby firm contact is ensured between the tires and the microswitch. A similar microswitch 69 is provided on the bottom of each chute near the discharge end to detect the passage of tires discharged from that chute. Each of the microswitches is electrically connected, by means not shown, to a remote console such as that illustrated in FIG. 5.

Referring particularly to FIG. 5, a console 75 is illustrated including a display face 78 having a first plurality of display windows 80 and a second plurality of display windows 82 provided thereon. Suitable display devices, such as electromechanical registers having multiple columns of numerical digits associated therewith, are provided in each of the display windows whereby a numerical inventory count of the tires handled by the storage structure is provided. In the embodiment illustrated, two display windows are provided for each chute, with the top display window 80 indicating the number of tires placed in the chute and the bottom display window 82 indicating the number of tires discharged therefrom. As illustrated, each chute is adapted to handle a different size of tires, such as 650 × 13 and the corresponding chute is designated accordingly. Therefore, the number of available tires of a particular size can be determined by subtracting the numerical total displayed on window 82 from the numerical total displayed in window 80 for the chute corresponding to the desired size of tires. In addition, the total number of tires placed into the storage structure is indicated in window 80 at the bottom of the console and the total number of tires discharged from the storage structure is indicated in window 82 at the bottom of the console. It should be apparent that other display arrangement could be used without departing from the invention.

A plurality of push buttons, for example, buttons 91–95, are provided on the console, with each push button being suitably connected, by means not shown, to operate the brake and ejector assembly of a corresponding chute.

In the operation of the structure described, with door 19 open, tires are placed in the chutes for storage. Tires of a selected size go into a particular chute, with the number of tires placed in each chute being detected by microswitch 61 and registered on the console as the tires roll down the chute. The tires are stored in an upright position within the chutes until it is desired to remove a tire. An operator desiring to remove a tire of a particular size from the storage structure merely presses a button on the console associated with a chute storing that size of tire. Upon actuation of the button, the ejector arm and brake arm in the corresponding chute are pivoted by shaft 59 with the brake arm being pivoted into contact with the second tire in the chute and the ejector arm being pivoted, simultaneously out of the path of the first tire in the chute permitting the first tire to roll out of that chute. As the tire rolls out of the chute it contacts the deflector and drops onto the conveyor at the front of the storage chute for removal to a desired location, such as a remote loading or service area.

It should be apparent that the storage structure described herein has numerous advantages over the storage methods used in the prior art. For example, the structure permits the compact storage of round objects such as vehicle tires and enables an operator to have access to tires of all sizes. In addition, the structure permits the safe, remote storage of tires and enables automatic dispensing of the tires from the structure while maintaining a running inventory count of the tires used and the tires available in any given size. It should be apparent that the structure is especially adapted for the storage of automobile and truck tires, but could be used, as well, for storing and dispensing other round objects, such as barrels and/or coils, so long as the individual chutes are constructed of a proper size to handle the objects being warehoused.

It is claimed and desired to secure by Letters Patent:

1. A structure for warehousing round objects comprising a building subdivided into a plurality of chutes positioned adjacent each other in vertical and horizontal rows, each having a discharge opening and an inlet opening elevated with respect to said discharge opening, said openings of each chute being connected by a runway that is inclined downwardly from the inlet opening to the discharge opening, a first set of pressure-responsive switches positioned, one in each chute near the inlet opening thereof, a second set of pressure-responsive switches positioned, one in each chute near the discharge opening thereof, an ejector arm movably mounted in each chute, said ejector arm being normally positioned at rest in the path of a first object located adjacent the discharge opening of the chute, a brake arm movably mounted in each chute normally positioned at rest out of the path of a second object located adjacent said first object in said chute, control means for selectively moving said ejector arm out of the path of said first object and for moving the brake arm into the path of said second object so that only the first object is discharged from said chute, visual numerical display means connected with said first and said second set of switches for providing a visual display representing the number of objects placed into each chute and the number of objects discharged from each chute, conveyor means associated with said chutes for receiving objects discharged therefrom and conveying the same away therefrom, deflector means suspended adjacent the discharge openings of said chutes operable to direct an object discharged from a chute onto the conveyor means, and door means for selectively closing the inlet openings of said chutes, said door means being provided with a plurality of thermostatically-controlled fire extinguishing units mounted thereon, with one unit being disposed adjacent each inlet opening with said door means in a closed position.

2. The structure of claim 1, wherein said deflector means comprises a sheet of flexible material suspended adjacent the discharge opening of a chute with one face of the sheet spaced from and facing said discharge opening.

* * * * *